Patented June 17, 1941

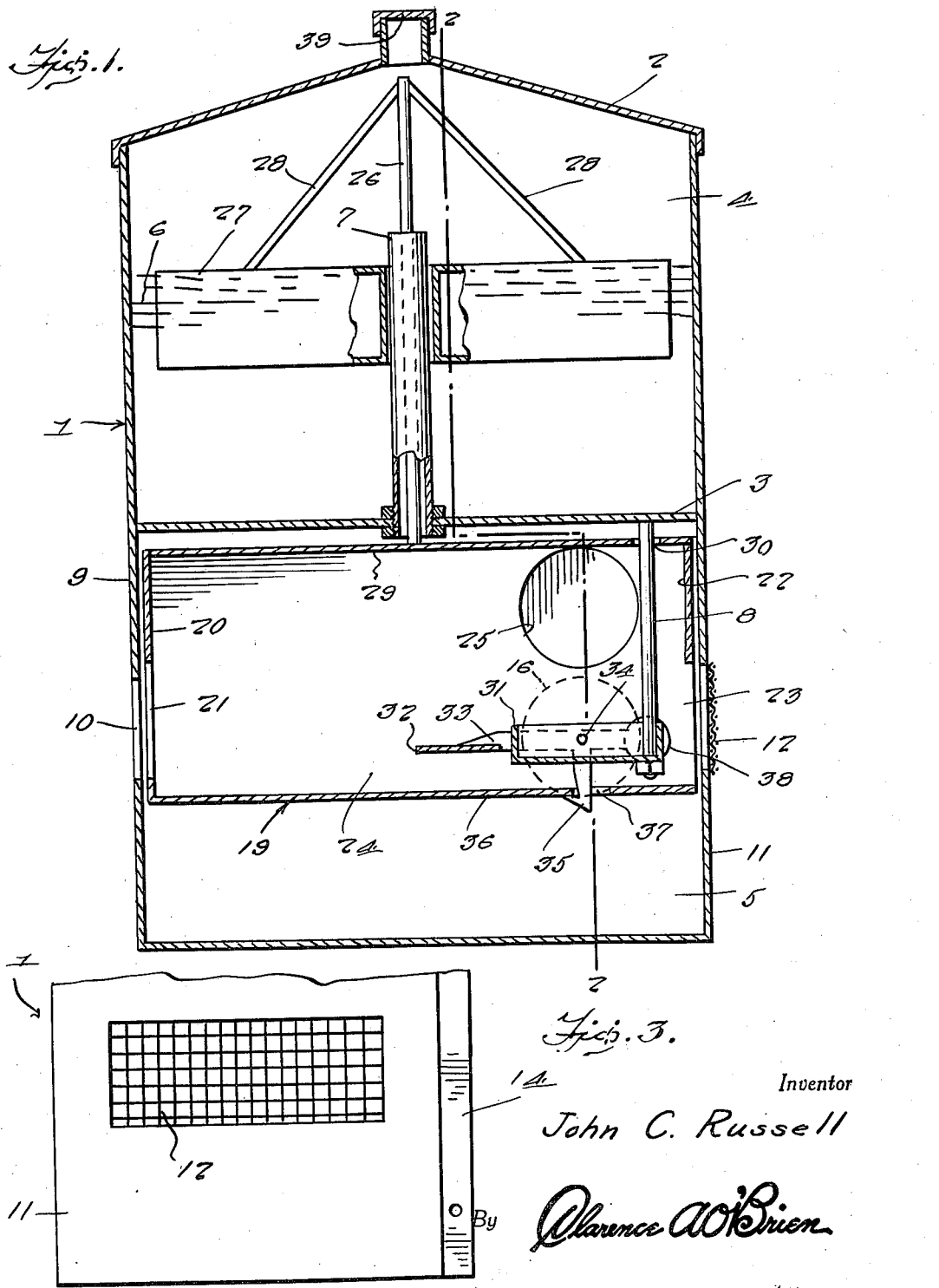

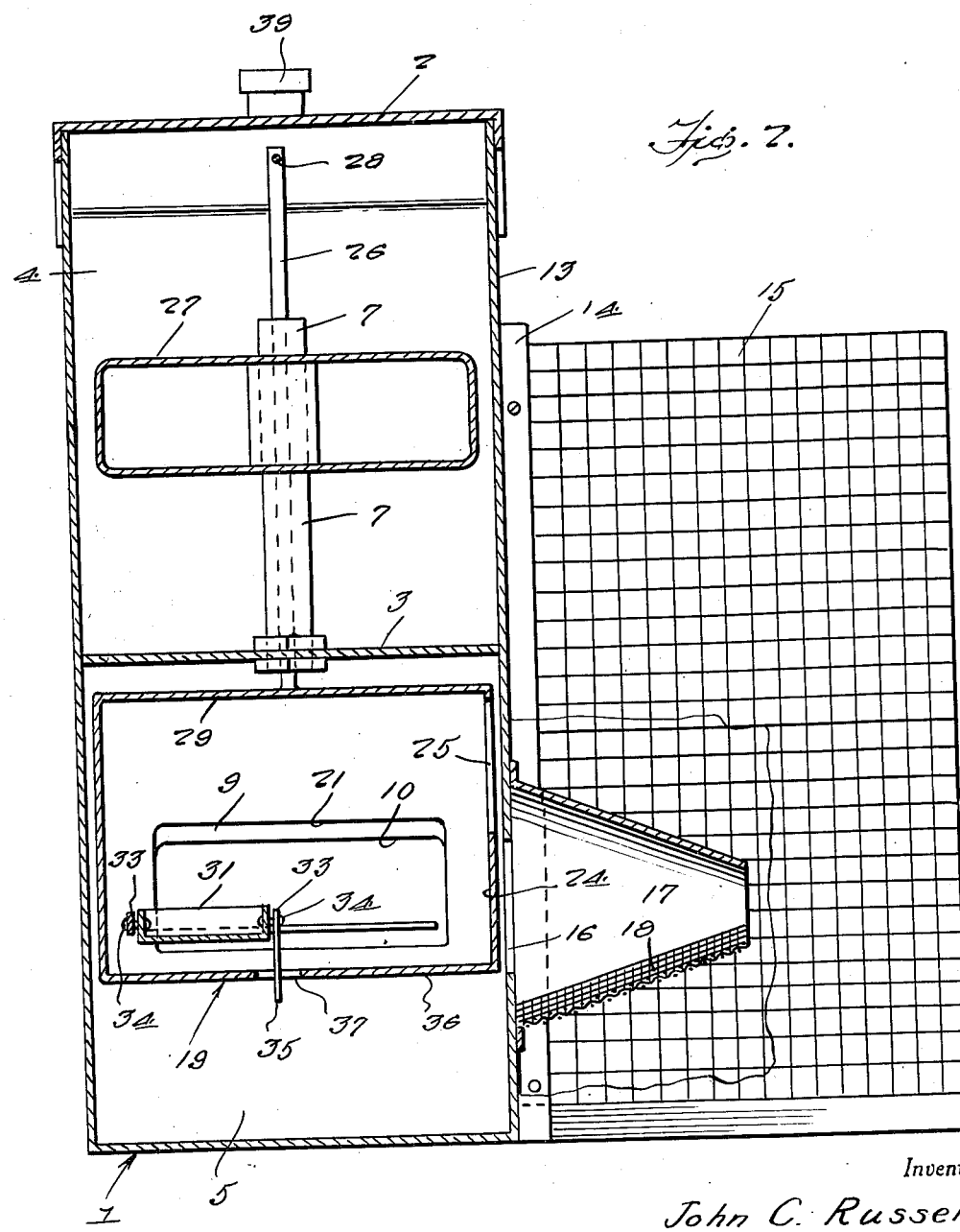

2,246,011

UNITED STATES PATENT OFFICE 2,246,011

TRAP

John C. Russell, Kilgore, Tex.

Application August 5, 1940, Serial No. 351,497

4 Claims. (Cl. 43—68)

The present invention relates to new and useful improvements in traps particularly for rats and mice and has for its primary object to provide, in a manner as hereinafter set forth, a device of this character comprising novel float operated means for automatically resetting itself after imprisoning the animal.

Other objects of the invention are to provide a trap of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in vertical longitudinal section through a trap constructed in accordance with the present invention.

Figure 2 is a cross sectional view, taken substantially on the line 2—2 of Fig. 1.

Figure 3 is a view in rear elevation of the lower portion of the trap.

Referring now to the drawings in detail, it will be seen that the embodiment of the invention which has been illustrated comprises a container of suitable material which is designated generally by the reference numeral 1. The container 1 includes a permanent leak-proof top 2 which is provided with a water tight filler cap 39. At an intermediate point, a horizontal partition 3 in the container 1 divides said container into upper and lower compartments 4 and 5, respectively, the upper compartment being adapted to receive a fluid, as at 6. Rising from the horizontal partition 3 to a point above the level of the fluid 6 in the compartment 4 is a tubular guide 7. It will be observed that the tubular guide 7 communicates with the lower compartment 5. Depending from the partition 3 in the lower compartment 5 is a rod 8.

The front 9 of the container 1 has formed in its lower portion an entrance opening 10. The back 11 of the container 1 is provided with a screened window 12 which is substantially aligned with the entrance 10. On one side 13 (see Fig. 2) of the container 1 is a flange 14 to which a cage 15 of suitable mesh wire is secured. An exit opening 16 in the side wall 13 of the container 1 communicates with the cage 15. A substantially conical guard 17 for the exit opening 16 projects from the wall 13 of the container 1 into the cage 15. The guard 17 includes a screen lower portion 18 to permit the animal passing therethrough to obtain a good foothold.

Mounted for vertical movement in the lower compartment 5 is a chamber 19. The front 20 of the chamber 19 is provided with an entrance opening 21 for registry with the opening 10 in the container 1. The back 22 of the chamber 19 has formed in its lower portion an opening 23 for the reception of light from the window 12 when said chamber is in raised or elevated position. One side wall 24 of the chamber 19 has formed in its upper portion an exit opening 25 for registry with the opening 16 when the chamber 19 is in lowered position in the compartment 5.

Rising from the chamber 19 is a stem 26 which is slidable in the tubular guide 7. The stem 26, it will be observed, projects upwardly from the tubular guide 7 into the upper compartment 4. Slidable on the guide 7 and operable in the fluid 6 in the upper compartment 4 is a float 27. Rods 28 connect the upper end portion of the stem 26 to the float 27.

The top 29 of the chamber 19 has formed therein an opening 30 through which the depending rod 8 passes. Mounted on the lower end portion of the rod 8 in the chamber 19 is a bait pan 31. The reference numeral 32 designates an animal depressed treadle provided with spaced, parallel legs 33 which are pivotally secured at an intermediate point, as at 34, on the side walls of the bait pan 31. Depending from one of the legs 33, at the pivot 34 thereof, is a latch 35 which is engageable beneath the bottom 36 of the chamber 19 through an opening 37 for releasably securing said chamber in raised position. A counterweight 38 on one of the legs 33 engages the latch 35 with the bottom of the chamber 19 when said chamber returns to raised position.

It is thought that the operation of the device will be readily apparent from a consideration of the foregoing. Briefly, when the trap is set the chamber 19 is in raised or elevated position as seen in Figs. 1 and 2 of the drawings. Thus, the openings 10 and 21 are in registry, the openings 25 and 16 are out of registry and the openings 23 and 12 are in registry. The animal enters the chamber 19 through the registering openings 10 and 21 and approaches the bait pan 31. The animal mounts the treadle 32 and its weight is sufficient to depress said treadle. In this manner the latch 35 is disengaged from the bottom 36 of the chamber 19. The chamber 19, with the weight of the animal added thereto, is too heavy to be sustained by the float 27 and said chamber thus moves downwardly in the lower compartment 5 of the container 1. In this manner the opening 21 is moved out of registry with the opening 10, the opening 23 is moved out of registry with the opening 12 thus shutting off the light from this source and the opening 25 is moved into registry with the opening 16. It will therefore be seen that the only exit through which the animal may escape from the container 1 is through the openings 25 and 16. The animal passes through the openings 25 and 16 and the substantially conical guard 17 into the cage 15. When the chamber 19 is thus lightened the float 27 elevates said chamber to raised or set position, in which position it is again secured by the latch 35. The construction and arrangement is such that the fluid will not escape from the compartment 4 through the tube 7 should the trap be overturned.

It is believed that the many advantages of a trap constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A trap comprising a container including upper and lower compartments, said upper compartment for the reception of a fluid, a float operable in the fluid in the upper compartment, an animal receiving chamber suspended from the float and operable in the lower compartment, and means operable by an animal for releasably securing the chamber in raised position.

2. A trap comprising a container including upper and lower compartments, said upper compartment for the reception of a fluid, a float operable in the fluid in the upper compartment, a chamber suspended from the float and operable vertically in the lower compartment, the chamber and the container having inlet openings therein for registry with each other when the chamber is in elevated position, said chamber and container further having exit openings therein for registry with each other when said chamber is in lowered position, and animal actuated means for releasably securing the chamber in raised position with an animal therein.

3. A trap comprising a container including a horizontal partition providing upper and lower compartments, said upper compartment for the reception of a fluid, a tubular guide rising from the partition above the level of the fluid in the upper compartment, a float operable in the fluid in the upper compartment and slidable on the guide, the lower compartment having animal entrance and exit openings therein, a chamber, for the reception of an animal, operable vertically in the lower compartment, a stem on said chamber extending slidably through the tubular guide, means securing the stem to the float for suspending the chamber from said float, the float constituting means for supporting the chamber in elevated position when said chamber is empty, the chamber having an entrance opening therein registering with the first named entrance opening when the chamber is in elevated position, said chamber further having an exit opening therein for registry with the first named exit opening when said chamber is in lowered position, and animal actuated means for releasably securing the chamber in elevated position when an animal is in said chamber.

4. A trap comprising a container including a horizontal partition providing upper and lower compartments, said upper compartment for the reception of a fluid, a tubular guide rising from the partition above the level of the fluid in the upper compartment, a float operable in the fluid in the upper compartment and slidable on the guide, the lower compartment having animal entrance and exit openings therein, a chamber, for the reception of an animal, operable vertically in the lower compartment, a stem on said chamber extending slidably through the tubular guide, means securing the stem to the float for suspending the chamber from said float, the float constituting means for supporting the chamber in elevated position when the chamber is empty, the chamber having an entrance opening therein registering with the first named entrance opening when the chamber is in elevated position, said chamber further having an exit opening therein for registry with the first named exit opening when said chamber is in lowered position, and animal actuated means for releasably securing the chamber in elevated position when an animal is in said chamber, the last named means including a rod depending from the partition into the chamber, a bait pan mounted on said rod in the chamber, a treadle including spaced legs pivotally secured to said bait pan, a latch on one of said legs engageable with the bottom of the chamber, and means on said one leg for engaging the latch with the chamber.

JOHN C. RUSSELL.